March 11, 1924.

F. CHANDLER

MOWER ATTACHMENT FOR TRACTORS

Filed Aug. 31, 1920　　2 Sheets-Sheet 1

1,486,727

Inventor
F. Chandler
by Wilkinson & Giusta
Attorneys.

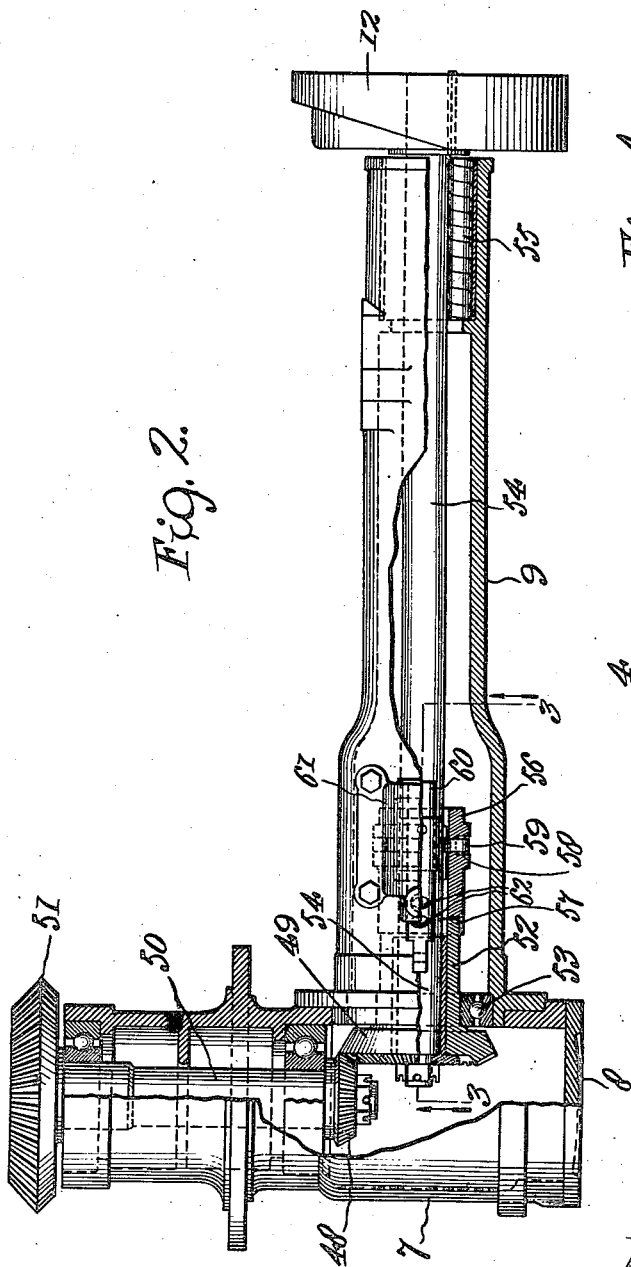

Patented Mar. 11, 1924.

1,486,727

UNITED STATES PATENT OFFICE.

FRED CHANDLER, OF YAKIMA, WASHINGTON.

MOWER ATTACHMENT FOR TRACTORS.

Application filed August 31, 1920. Serial No. 407,161.

*To all whom it may concern:*

Be it known that I, FRED CHANDLER, a citizen of the United States, residing at Yakima, in the county of Yakima and State of Washington, have invented certain new and useful Improvements in Mower Attachments for Tractors; and I do hereby declare the following to be a full, clear, and exact description of the invention, such as will enable others skilled in the art to which it appertains to make and use the same.

The present invention relates to mower attachments for tractors and has for an object to provide a compact attachment for the side of a tractor, the attachment being made up of few and simple parts coordinated in closely-assembled grouping.

In the accompanying drawings forming a part of this application, and in which similar reference symbols indicate corresponding parts in the several views:

Figure 2 is a detail longitudinal sectional view through the transmission casing and its parts, showing the clutch in engaged position.

Figure 3 is a longitudinal section taken through the same substantially on the line 3—3 in Figure 2.

Figure 4 is a transverse section through the clutch mechanism taken on the line 4—4 of Figure 3.

Figure 1:
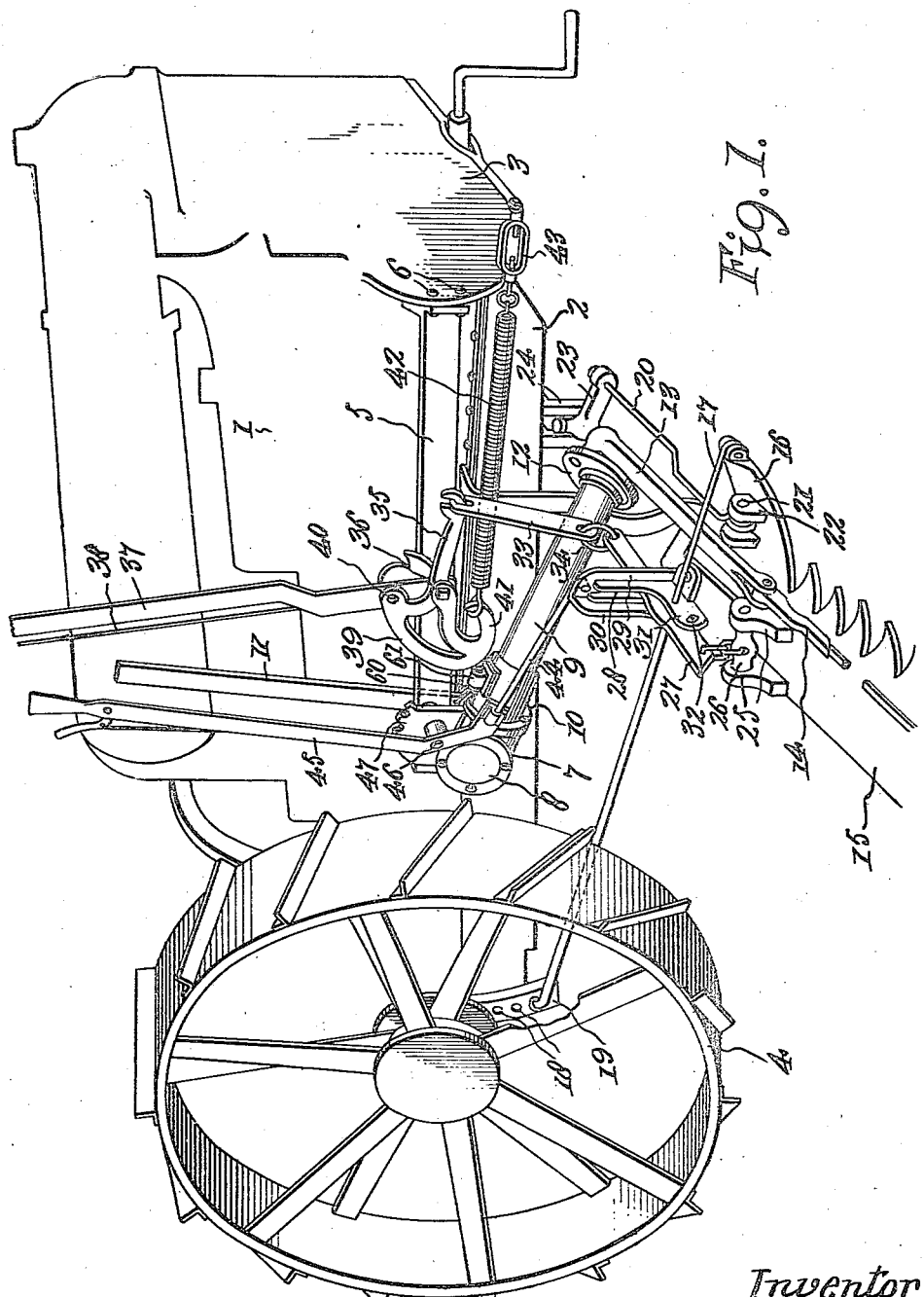
Figure 1 is a perspective view of a tractor with the front wheels and steering gear removed, and showing an improved attachment constructed in accordance with the present invention.

Referring more particularly to the drawings, 1 designates the motor of a tractor having the crank case and combined transmission housing 2 and front cover plate 3 which is bolted on in the usual manner. At 4 is represented one of the drive wheels of the tractor which is coupled to the engine 1 in the usual manner.

In accordance with the present invention I employ a bar 5 running longitudinally of the tractor and fitted at one side thereof, being held in place by bolts 6 employed to hold the cover 3 on the crank case 2. At its rear end the bar 5 rests upon a housing 7 for a transverse shaft, access to which may be had by a bolted cover plate 8. The shaft in the housing 7 is adapted to be driven by the engine 1, and is in turn coupled to a pitman shaft in a casing or housing 9 extending forwardly at substantially right angles to the housing 7. These parts are held on the tractor in any suitable manner, as for instance by a hanger 10.

A disk 12 is driven by the shaft in the housing 9 and is connected to a pitman 13 which drives the connecting rod 14 for reciprocating the movable parts of the motor implement indicated at 15. The latter is only partially shown, as it forms no portion of the invention but may be made in accordance with any approved construction.

The sickle bar shoe 16 receives the forward end of a brace 17 which is adjustably secured in perforations 18 made in the draw bar cap 19 at the rear of the tractor. The brace 17 takes up all strains and stresses of a longitudinal nature and prevents the displacement of the implement.

A transverse brace rod 20 is coupled over a pin 21 mounted between ears 22 on the shoe 16 and has its opposite end engaged with an arm 23 pivotally mounted in a hanger 24 secured beneath the crank case 2. The arm 23 may rotate in the hanger 24 in response to the tilting or lowering of the forward end of the sickle bar. On the sickle bar 15 are also mounted ears 25 between which extend the pin 26 coupled to the outer end of a link 27 which passes slidingly through a slot 28 made in an upstanding bracket 29, bolted or otherwise secured to said sickle bar.

The bracket is formed with strengthening webs or flanges 30 and with an arm 31 extending outwardly from the lower ends thereof; a pin 32 extends through the arm 31, the pin and the brace rod 17 forming a support for the link 27 to slide on. The rod 17 also passes through arm 31. A second link 33 is coupled as by a ring 34 to the inner end of the first named link 27. The link 33 extends substantially vertically and is loosely engaged with the forwardly projecting short arm 35 of a bell crank lever fulcrumed at 36, and having its other arm 37 extending upwardly in a convenient position to be grasped by the operator.

A latch rod 38 is employed to lock the lever 37 in the adjusted position. Movable with the lever is a segment 39 secured to said lever by a pin 40, and having a hook or bill 41 to receive the rear end of a coil spring 42 the other end of the spring being secured as by a turn buckle 43 to the forward end of the cover plate 3. A rod 44 is coupled to the bracket 29 at its upper end and to the lower end of a lever 45 fulcrumed at 46 on a latch segment 47.

In Figures 2, 3 and 4 there is shown in detail the transmission means between the usual gearing of the tractor engine and the implement to be operated. The casing 9 is provided with an enlargement toward its rear end which fits into a transverse housing 7 and in which are placed the intermeshing bevel gears 48 and 49. The bevel gear 48 is mounted on a shaft 50 which projects inwardly through the housing 7, and is provided with a bevel gear wheel 51 adapted for intermeshing engagement with the transmission mechanism of the tractor engine.

The bevel gear wheel 49 is secured upon the inner end of a sleeve or collar 52 mounted in a bearing 53 arranged in the inner end of the housing 9, and is adapted to be rotated at all times during the operation of the engine 1. An inner driven shaft 54 has bearing within the sleeve 52 and extends lengthwise within the casing 9, and is mounted at its forward end upon suitable roller bearings 55 housed in the forward end of the casing 9.

A counterbalanced disk 12 is secured upon the forward end of the shaft 54 and is adapted for engagement with the pitman 13, as shown in Figure 1.

Keyed upon the driven shaft 54 is a collar 56 of substantially the same diameter as the sleeve or collar 52. The collars 56 and 52 are provided with teeth 57 adapted to intermesh when the collar 56 is slid toward the collar 52. The collar 56 has an annular groove 58 therein into which fits a shifting fork 59 fixed upon a shiftable bar 60 mounted in a cap 61 detachably arranged upon the top of the housing 9. The bar 60 is provided in its upper side with notches 62 into which yieldingly engages a spring pressed dog 63 for maintaining the bar 60 in its operative or inoperative positions.

The bar 60 is connected to the lever 11, as shown in Figure 1, and is adapted to be shifted longitudinally thereby to engage and disengage the clutch.

The structure is such that the clutch is supported and housed within the casing 9 which also supports and houses the driven shaft 54, so that the transmission mechanism as a whole may be easily attached to the tractor engine 1.

In operation the engine 1, through the shafts in the housings 7 and 9, acts to rotate the disk 12, and through the pitman 13 causes the reciprocation of the movable part of the cutter bar 15. In going to and from the field it is desired to swing the sickle bar up so that it will not come in contact with other objects, and for this purpose the lever 37 is swung rearwardly about its center 36.

The spring 42 acts as a counterbalance to assist in this movement and to raise the weighted parts of the cutter bar. The cutter bar may be swung up and down by the lever 37.

The lever 45 is used to raise or lower the forward edge of the sickle bar so that a high or low cut may be had as desired. By swinging the lever 45 in a rear direction the rod 44 will push upon the bracket 29 and cause the front edge of such cutter bar to be moved downward at an inclination closer to the ground. An opposite movement of the lever 45 will have the reverse result.

It is obvious that those skilled in the art may vary the details of construction and arrangements of parts without departing from the spirit of my invention, and therefore I do not wish to be limited to such features except as may be required by the claims.

I claim:

1. An attachment for tractors comprising a mower including a mower shoe, a slotted bracket carried by said shoe, a link engaging slidably through said bracket and having attachment at its outer end to the mower, means attached to the inner end of the link for raising the mower, and brace means connected longitudinally and transversely of the tractor and between the tractor and said shoe.

2. An attachment for tractors comprising a mower having a shoe at its inner end, a slotted bracket upstanding from the shoe, a link slidable through the bracket and attached at its outer end loosely to the mower, a lever supported from the tractor and having flexible connection to the inner end of the link, and spring means associated with the lever.

3. An attachment for tractors having motor castings comprising a mower extending therefrom and having a mower shoe, a transverse brace rod secured at one end to the shoe and extending beneath the motor casting, a hanger carried by the motor casting, an arm pivotally mounted in the hanger and having connection to the inner end of the brace rod, means to tilt the mower upwardly including a slotted bracket attached to the mower shoe, a lever on the tractor having fixed attachment to the slotted bracket, a link extending through the slotted bracket and having attachment to the mower at its outer end, and a lifting lever on the tractor having flexible connection to the inner end of said link, substantially as described.

4. An attachment for tractors comprising a bar extending longitudinally of the tractor, a lifting lever and a tilting lever pivoted on the bar, a mower extending outwardly from the tractor, connecting means between said lifting lever and the mower, means for guiding said connecting means, and a coupling between said tilting lever and said guiding means.

5. An attachment for tractors comprising a bar extending along one side of the tractor, a lifting lever pivoted to the bar, a tilting lever also pivoted to the bar, spring means associated with the lifting lever and with the tractor, a mower extending from the side of the tractor and having a shoe, a slotted bracket on the shoe, a rod coupling the slotted bracket to the tilting lever, a link extending slidably through the slotted bracket and connected flexibly at its outer end to the mower, and a second link flexibly connected to the inner end of the first link and having its inner end in turn connected to the lifting lever.

FRED CHANDLER.